United States Patent [19] [11] Patent Number: 5,559,813
Shimizu [45] Date of Patent: Sep. 24, 1996

[54] DIGITAL DATA PROCESSING SYSTEM FOR TRANSMITTING INFORMATION GROUPS DIVIDED INTO SEGMENTS COMPRISED OF VIDEO DATA, EDC'S, ECC'S AND SYNC DATA

[75] Inventor: Tetsuya Shimizu, Yokohama, Japan

[73] Assignee: Canon Kabushiki Kaisha, Tokyo, Japan

[21] Appl. No.: 213,478

[22] Filed: Mar. 16, 1994

Related U.S. Application Data

[63] Continuation of Ser. No. 710,405, Jun. 5, 1991, abandoned.

[30] Foreign Application Priority Data

Jun. 15, 1990 [JP] Japan ................... 2-157330

[51] Int. Cl.⁶ .................... G06F 11/10; H03M 13/00
[52] U.S. Cl. .................... 371/37.4; 371/37.7
[58] Field of Search .................... 371/37.4, 37.7, 371/38.1, 39.1, 37.5, 37.1

[56] References Cited

U.S. PATENT DOCUMENTS

| | | | |
|---|---|---|---|
| 4,206,440 | 6/1980 | Doi | 371/37.7 |
| 4,698,810 | 10/1987 | Fukuda et al. | 371/38 |
| 4,785,451 | 11/1988 | Sako | 371/37.7 X |
| 4,796,261 | 1/1989 | Moriwaki | 371/40 |
| 4,829,525 | 5/1989 | Sugiyama et al. | 371/38 |
| 4,995,022 | 9/1990 | Odaka | 371/37.4 |
| 4,998,252 | 3/1991 | Suzuki et al. | 371/37.5 |
| 5,122,876 | 6/1992 | Aoki | 358/133 |
| 5,150,210 | 9/1992 | Hoshi et al. | 358/135 |
| 5,151,905 | 9/1992 | Yokono et al. | 371/39.1 |
| 5,311,521 | 5/1994 | Fitingof et al. | 371/39.1 |

FOREIGN PATENT DOCUMENTS 0137721  4/1985  European Pat. Off. .

OTHER PUBLICATIONS

"Fehlerkorrektur in der digitalen 4:2:2-Komponenten-Videoaufzeichnung" by Jim Wilkinson, H. Przybyla, Fernseh-Und Kino-Technik vol. 40. No. 11, Nov. 1986, Heilderlberg, DE. pp. 522–526.

*Primary Examiner*—Robert W. Beausoliel, Jr.
*Assistant Examiner*—Joseph E. Palys
*Attorney, Agent, or Firm*—Fitzpatrick, Cella, Harper & Scinto

[57] ABSTRACT

A digitally coded signal is encoded with an error correction code and an error detection code. When the signal is decoded, the error correction code is used to correct errors. The error detection code is then used to discriminate whether the error correction process has operated properly, and if it has not operated properly then interpolation is used to avoid remaining errors. Preferably when the data is encoded the error detection code is provided before the error correction code is provided.

19 Claims, 3 Drawing Sheets

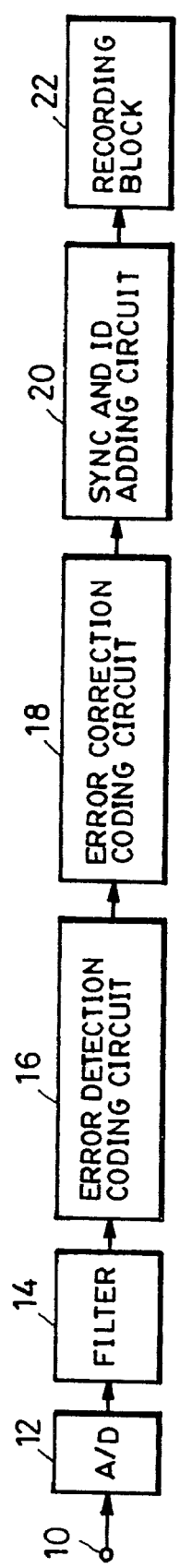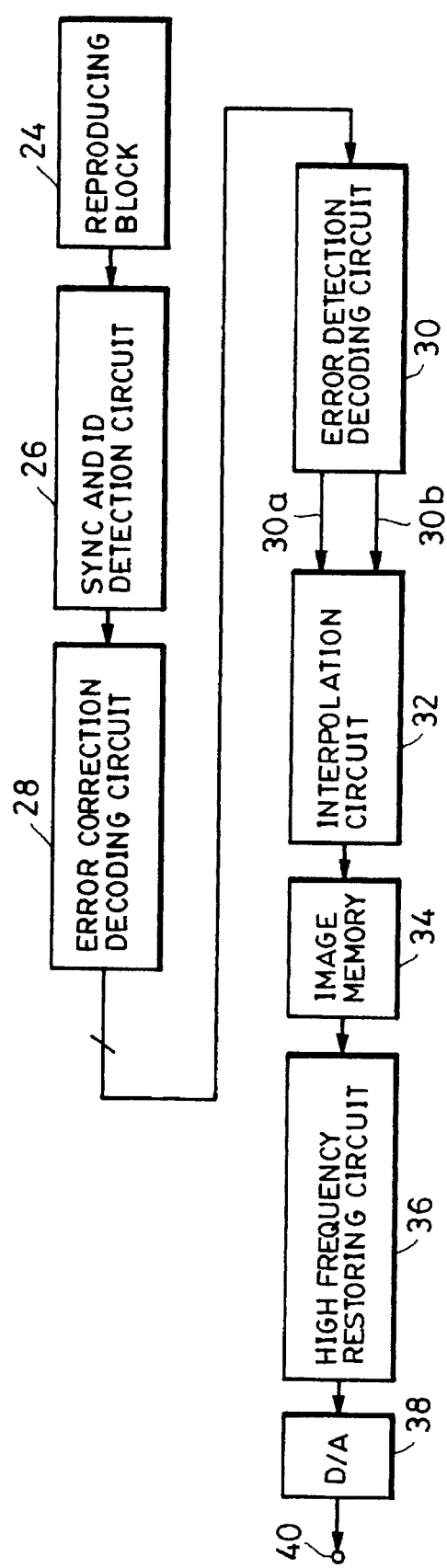

DIGITAL DATA PROCESSING SYSTEM FOR TRANSMITTING INFORMATION GROUPS DIVIDED INTO SEGMENTS COMPRISED OF VIDEO DATA, EDC'S, ECC'S AND SYNC DATA

This application is a continuation of application Ser. No. 07/710,405 filed Jun. 5, 1991 now abandoned.

BACKGROUND OF THE INVENTION

1. Field of the Invention

This invention relates to a digital processing system. The present invention may be applied to a digital recording and/or reproducing system. An aspect of the invention relates to the error compensating ability of such a system.

2. Related Background of Art

In recent years, digital recording and/or reproducing devices such as so called digital VTR have become widely used. One kind of digital VTR records segments by a method in which information for one TV frame is divided into several segments and these segments are recorded separately on several recording tracks of magnetic tape.

FIG. 2 shows an example of coded data for one such segment of TV frame information. In this example a double product coding which consists of an inner coding (n, m) and an outer coding (q, p) is executed. This kind of double product coding can be Reed-Solomon coding.

When reproducing this coded data, it is decoded and errors contained in the data are corrected using the error correction code if this is possible and if it is not possible to correct errors using the error correction code but an error is nevertheless detected, a compensation such as interpolation is executed by using data from information for an adjacent frame or for the same frame. However, the error rate in a transmission system such as a digital VTR may vary over a wide range and if the error rate is very high, improper correction of the errors may be carried out.

Since the prior digital VTR compensates decoded data depending on the result of the error correction, if improper error correction is carried out as mentioned above then the compensation may not be carried out when it should be, or may be carried out incorrectly or inappropriately. This compensation failure may cause serious damage in the reproduced image on a TV screen. In particular a burst error tends to occur for a relatively long period in a special effect reproducing mode of a VTR. So, unless the correction ability is greatly improved, a high quality image in special effect reproduction cannot be obtained.

SUMMARY OF THE INVENTION

An object of tile present invention is to provide a digital data processing system which can resolve the above-mentioned problems.

Another object of the present invention is to provide a recording and/or reproducing system having a high quality image without a great amount of error correction codes.

Still another object of the present invention is to provide a recording and/or reproducing system that can reduce false error correction or false error compensation.

In one aspect of the present invention, a digitally coded signal is encoded with an error correction code and an error detection code. When the signal is decoded, the error correction code is used to correct errors. The error detection code is then used to discriminate whether the error correction process has operated properly, and if it has not operated properly then compensation such as interpolation is used to avoid remaining errors.

In order to achieve the above-mentioned object, an aspect of the present invention provides a digital data processing system, comprising receiving means for receiving a digital coded signal which contains an error detection code and an error correction code, decoding means for decoding said digital coded signal and for generating an indication signal when an error is detected by using said error detection code, and compensating means for compensating an output of said decoding means, characterised in that said compensating means compensates an output of said decoding means when said indication is generated.

Accordingly compensation will normally be carried out correctly even if there is improper error correcting, and the added code length in total is less than the added code length which the prior art would need for obtaining the same error compensation ability.

BRIEF DESCRIPTION OF THE DRAWINGS

FIG. 1A illustrates a block diagram of recording system of an embodiment of the present invention.

FIG. 1B illustrates a block diagram of reproducing system of an embodiment of the present invention.

DETAILED DESCRIPTION OF THE PRESENT EMBODIMENTS

An embodiment of the present invention, given by way of non-limiting example, will now be described with reference to the drawings.

FIGS. 1A and 1B respectively illustrate a recording and a reproducing block diagram of a digital VTR. An analog video signal input through an input terminal 10 is converted into an 8-bit digital video signal by an analog to digital converter 12.

The 8-bit digital video signal is supplied to a filter 14, where the digital video signal is sub-sampled and then filtered to cut off noise components caused by the sub-sampling.

The filtered digital video signal is encoded as shown in FIG. 3.

Figure 2A:
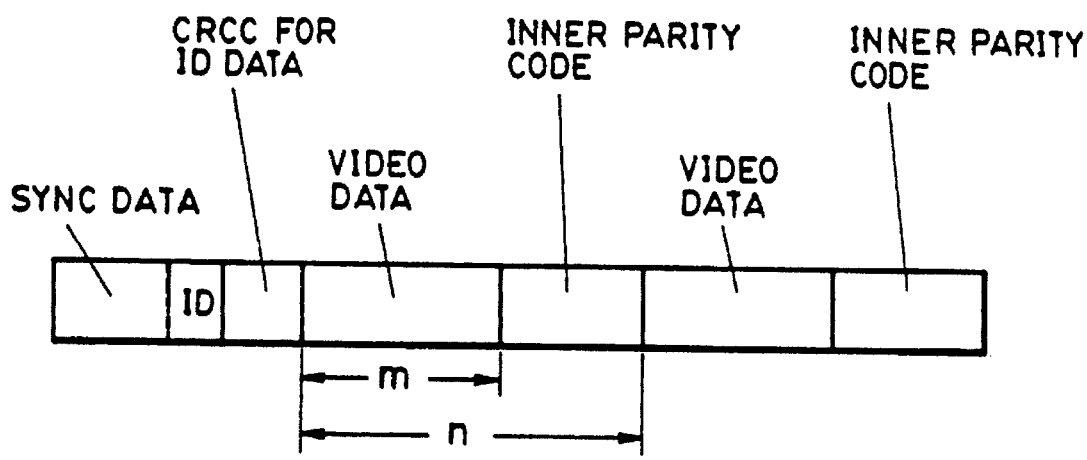
FIG. 2A and 2B illustrate a coded data format of prior art.
Figure 2B:
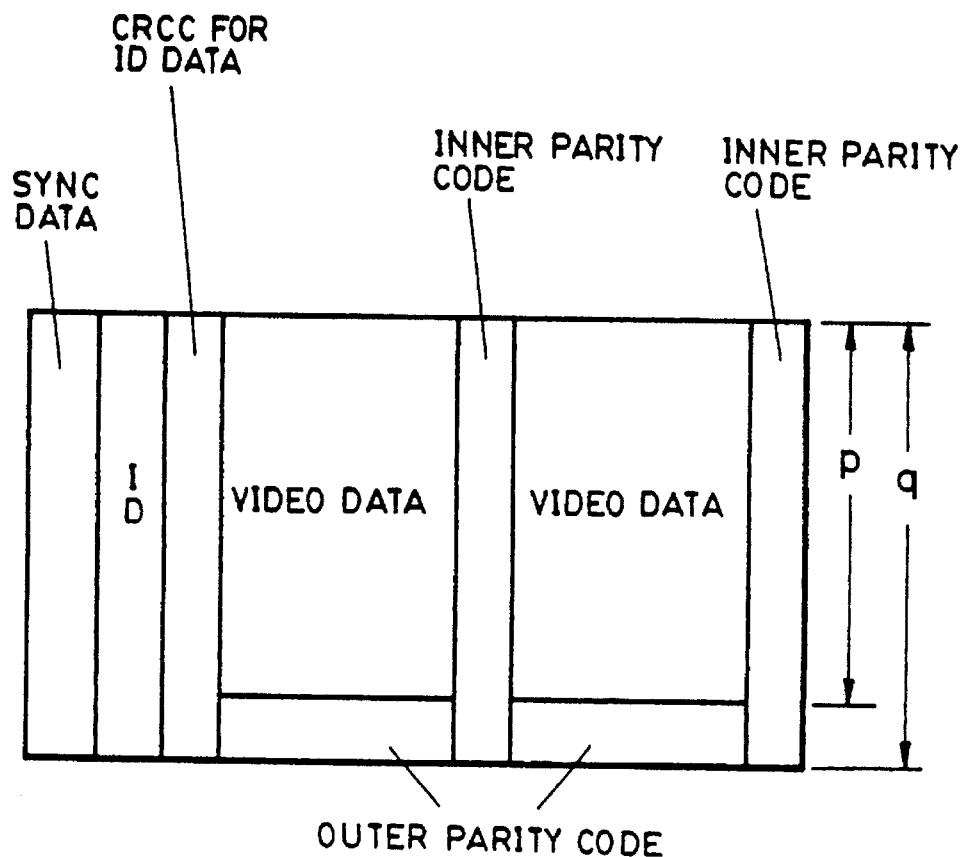
Figure 3A:
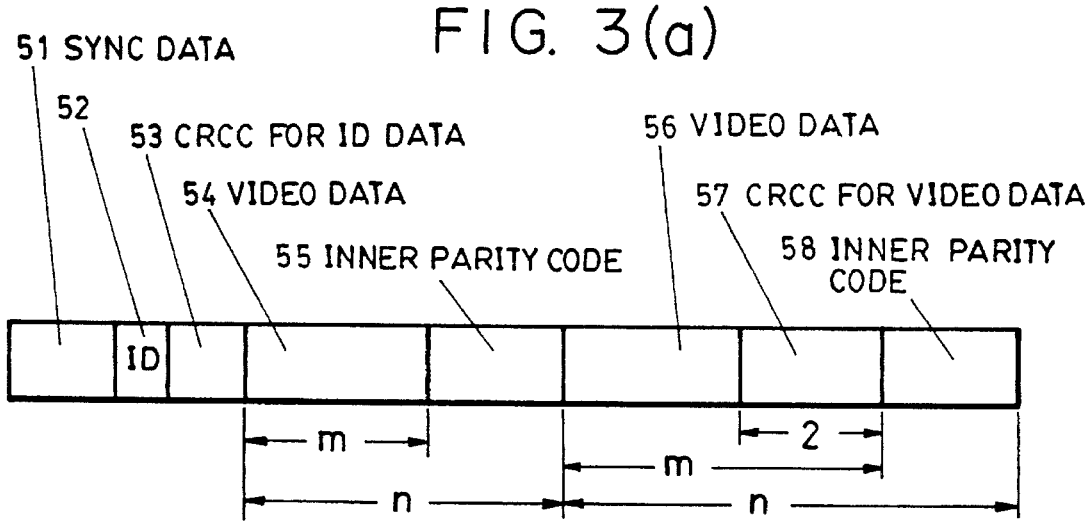
FIG. 3A and 3B illustrate a coded data format of an embodiment of the present invention.

FIG. 3(a) shows one segment of the coded video data. The segment comprises a sync data portion 51, an ID data portion 52, a CRCC portion 53 for the ID data, a first video data portion 54, which is m bytes long, a first inner parity code section 55 for the first video data portion 54, a second video data portion 56, which is (m-2) bytes long, a CRCC portion 57 for the video data of both portions 54, 56, which CRCC portion 57 is 2 bytes long, and a second inner parity code portion 58 for the combination of the second video data portion 56 and the CRCC portion 57. The first video data portion 54 and the first inner parity code portion 55 jointly comprise n bytes, and the second video data portion 56, the CRCC portion 57 and the second inner parity code portion 58 jointly comprise n bytes.

Figure 3B:
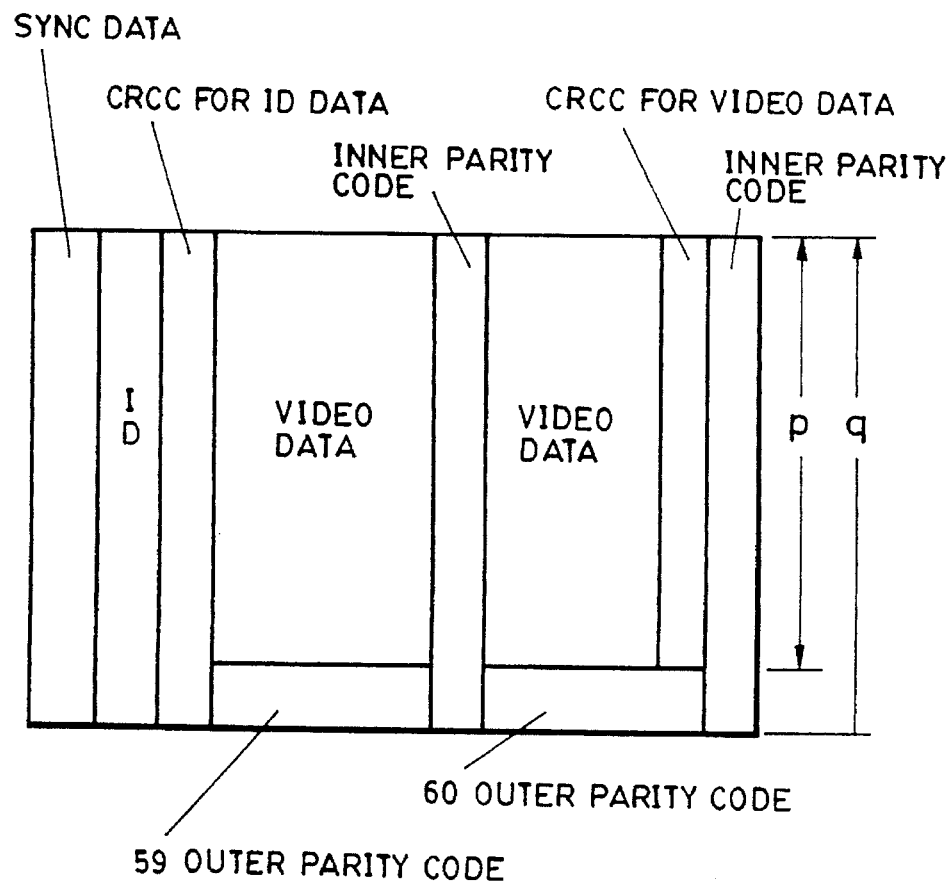

FIG. 3(b) shows a block of data, made up of q segments. Of the q segments in FIG. 3(b) the first p segments are as shown in FIG. 3(a) and the remaining segment or segments have outer parity codes 59,60 in place of the video data portions 54,56 and the CRCC portion 57.

The filtered digital video signal is supplied to an error detection coding circuit 16, where an error detection code such as CRCC (Cyclic Redundancy Check Code) is added to the signal. In this embodiment the error detection code has two bytes and is provided for each segment, which includes (2m−2) bytes of video data as shown in FIG. 3(a).

An error correction coding circuit 18 codes the video data to which the error detection code had been added by circuit 16 in the order of outer coding (q, p coding, provided by outer parity codes 59,60) and then inner coding (n, m coding, provided by the inner parity code portions 55,58) according to, for example, a Reed-Solomon coding method.

A sync and ID adding circuit 20 adds sync block data which consists of sync data 51, ID data 52 and a CRCC 53 for the ID data to the signal output by the error correction coding circuit 18.

A recording block 22 has a function as a transmitter and modulates the signal output by the sync and ID adding circuit 20 to record it on a recording medium.

In the embodiment of FIG. 1A, the error detection coding circuit 16 operates on the digital data before the error correction coding circuit 18, so that the error detection code is already present in the data when the error correction code is added. This arrangement is preferred to the reverse arrangement of error correction coding and then error detection coding.

In FIG. 1B a reproducing block 24 has a function as a receiver and picks up the recorded data on the recording medium and demodulates lit. A sync and ID detection circuit 26 detects the sync data and the ID data and checks and corrects the ID data by using the CRCC for the ID data.

An error correction decoding circuit 28 corrects any errors in an output of the circuit 26 caused during recording and reproducing so far as possible by repeatedly decoding it using the inner parity coding data 55,58 and the outer parity coding data 59,60 according to a predetermined algorithm. Error corrected data is then supplied to an error detection decoding circuit 30.

The circuit 30 uses the CRCC portion 57 for the video data to detect any remaining error in the error corrected data. The circuit 30 outputs the video data through a line 30a and a flag signal through a line 30b, where the flag signal is "1" when an error is detected and "0" when an error is not detected by the error detection circuit 30.

An interpolation circuit 32 receives the flag signal and the video signal, and executes interpolation when the flag signal is "1". The output of the interpolation circuit 32 is supplied to an image memory 34 and is stored in an address designated by the ID data 52.

The interpolation by the interpolation circuit 32 is executed by using the adjacent upper and/or lower line of video signal or using the same line of video signal of an adjacent frame signal or by any other suitable method. If the interpolation is executed by using the same line of video signal of an adjacent frame signal, it can be carried out simply by not overwriting the pre-existing content of the image memory 34.

The data stored in the image memory 34 is read out sequentially and is supplied to a high frequency restoring circuit 36 which produces a high frequency component by, for example, interpolation.

The output of the restoring circuit 36 is then supplied to a digital to analog converter and is converted into analog signal, and is then output from an output terminal 40.

In the special effect reproduction mode such as a search mode of VTR, valid data may only be available intermittently. By storing the data in the image memory 34 only when the flag signal is "0", a high quality reproduced image can be obtained.

What is claimed is:

1. A device for processing video data, wherein on transmitting an information group consisting of a plurality of samples of video data, an error detection code is added to said information group for forming a data group by an error detecting coding operation, an error correcting code is added to said data group by an error correcting operation, and then said data group to which said error correcting code is added is divided into a plurality of segments, wherein a plurality of sync blocks are generated by adding sync data to a front portion of each of the plurality of segments which includes the video data, the error detection code and the error correcting code, comprising:

receiving means for receiving the plurality of sync blocks to output the data group;

error correcting means for correcting errors in the data group by using the error correcting code;

error detecting means for detecting errors in the data group output from said error correcting means by using the error detecting code; and interpolating means for interpolating the information group containing error data relating to the errors detected by said error detecting means.

2. An apparatus according to claim 1, wherein said interpolating means performs at least one of a first interpolating operation by using video data of a picture including the error data relating to the errors detected by said error detecting means and a second interpolating operation by using video data of a different picture from the picture including the error data relating to the errors detected by said error detecting means.

3. An apparatus according to claim 1, wherein said error detecting code comprises a CRCC.

4. An apparatus according to claim 1, wherein said error correcting code comprises a Reed-Solomon code.

5. An apparatus according to claim 1, wherein said receiving means includes reproducing means for reproducing said video signals from a recording medium.

6. A signal processing device, comprising:

error detection coding means for forming a data group by adding an error detecting code to an information group consisting of information data of a plurality of samples;

error correction coding means for error correction coding by adding an error correction code to said data group;

generating means for dividing said data group to which the error correction code is added into a plurality of segments to generate a plurality of sync blocks by adding sync data to a front portion of each of the plurality of segments which includes the information data, the error detection code and the error correction code; and transmitting means for transmitting the plurality of sync blocks.

7. A device according to claim 6, wherein said transmission means comprises recording means for recording the output of said error correction and coding means on a recording medium.

8. A device according to claim 6, wherein said error detecting code comprises CRCC.

9. A device according to claim 6, wherein said transmission means transmits continuously the plurality of the portions of the error correction coded data group.

10. A device according to claim 6, wherein said error correction coding means performs Reed-Solomon coding.

11. A device for transmitting information data to an apparatus, said apparatus reproducing the information data by storing received information data, comprising:

error detection coding means for forming a data group by adding an error detecting code to an information group consisting of the information data of a plurality of samples;

error correction coding means for error correction coding by adding an error correction code to said data group;

generating means for dividing said data group to which the error correction code is added into a plurality of segments to generate a plurality of ID blocks by adding ID data to be used for determining an address of a memory in which said information data is written, to a front portion of each of the plurality of segments Which includes the information data, the error detection code and the error correction code; and transmitting means for transmitting the plurality of ID blocks.

12. A device according to claim 11, wherein said transmitting means comprises recording means for recording the output of said error correction coding means on a recording medium.

13. A device according to claim 11, wherein said error detecting code comprises CRCC.

14. A device according to claim 11, wherein said transmitting means transmits continuously the plurality of the error correction coded data groups.

15. A method for processing video data, wherein on transmitting an information group consisting of a plurality of samples of video data, an error detection code is added to said information group for forming a data group by an error detecting coding operation, an error correcting code is added to said data group by an error correcting operation, and then the data group to which said error correcting code is added is divided into a plurality of segments, wherein a plurality of sync blocks are generated by adding sync data to a front portion of each of the plurality of segments which includes the video data, the error detection code and the error correcting code, comprising the steps of:

receiving the the plurality of sync blocks to output the data group;

correcting errors in the data group by using the error correcting code;

detecting errors in the data group output in said error correcting step by using the error detecting code; and interpolating the information group containing error data relating to the errors detected in said error detecting step.

16. A method according to claim 15, wherein said interpolating step includes performing at least one of a first interpolating operation by using video data of a picture including the error data relating to the errors detected in said error detecting step and a second interpolating operation by using video data of a different picture from the picture including the error data relating to the errors detected in said error detecting step.

17. A method according to claim 15, wherein said error detecting code comprises a CRCC.

18. A method according to claim 15, wherein said error correcting code comprises a Reed-Solomon code.

19. A method according to claim 15, wherein said receiving step includes reproducing the video data from a recording medium.

* * * * *

UNITED STATES PATENT AND TRADEMARK OFFICE
CERTIFICATE OF CORRECTION

PATENT NO. : 5,559,813
DATED : September 24 1996
INVENTOR(S) : TETSUYA SHIMIZU

Page 1 of 2

It is certified that error appears in the above-indentified patent and that said Letters Patent is hereby corrected as shown below:

ON TITLE PAGE

[56] References Cited

"Heilderlberg," should read --Heidelberg--.

COLUMN 2

Line 12, "characterised" should read --characterized--;
Line 27, "FIG." should read --FIGS.--;
Line 28, "FIG." should read --FIGS.--.

Column 3

Line 28, "lit." should read --it.--;

COLUMN 4

Line 23, "error detecting code;" should read --error detection code;--.

UNITED STATES PATENT AND TRADEMARK OFFICE
CERTIFICATE OF CORRECTION

PATENT NO. : 5,559,813
DATED : September 24 1996
INVENTOR(S) : TETSUYA SHIMIZU

It is certified that error appears in the above-indentified patent and that said Letters Patent is hereby corrected as shown below:

<u>COLUMN 5</u>

Line 15, "Which" should read --which--.

Signed and Sealed this

Thirtieth Day of September, 1997

Attest:

BRUCE LEHMAN

*Attesting Officer*    *Commissioner of Patents and Trademarks*